Oct. 30, 1951     J. A. LONG     2,573,035
ELECTRONIC LEVEL CONTROL
Filed July 29, 1944
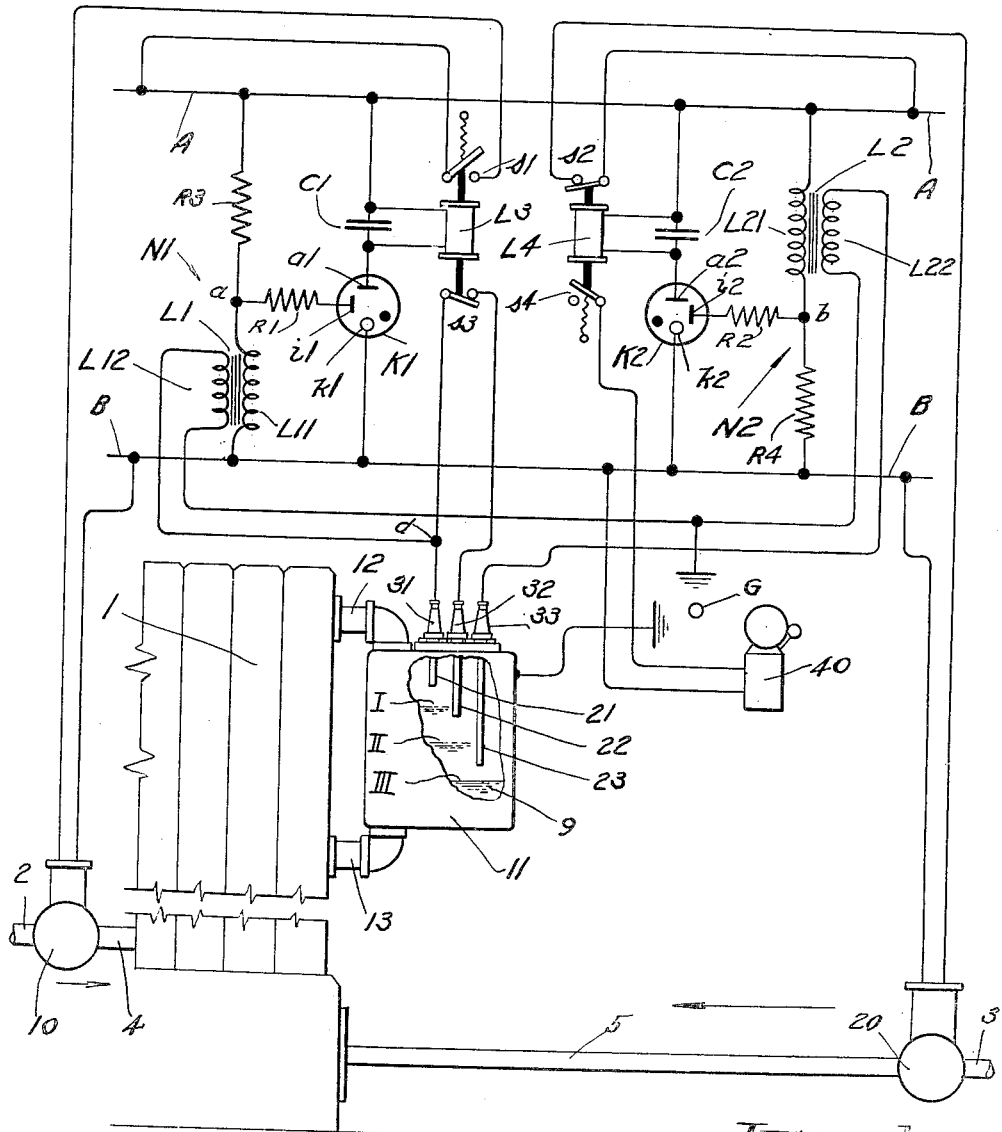
Inventor
John A. Long
By Rudolf Amann
Attorney Patented Oct. 30, 1951

2,573,035

UNITED STATES PATENT OFFICE 2,573,035

ELECTRONIC LEVEL CONTROL

John A. Long, Cambridge, Mass., assignor to Photoswitch, Incorporated, Cambridge, Mass., a corporation of Massachusetts Application July 29, 1944, Serial No. 547,218

4 Claims. (Cl. 122—448)

This invention relates to the electrical control of apparatus in accordance with particular operating conditions thereof as determined by the measurement of varying liquid impedances by fluid supervising probes.

It is one of the main objects of the present invention to provide improved apparatus of the above-indicated type which is simple and inexpensive and yet very reliable and certain in operation; other objects are to provide a liquid level control especially suited for such installations as boiler feedwater systems, and providing for automatic maintenance of the desired level as well as for safety measures if that level should for some reason not be maintained; to provide a control circuit of this type which can be used with electron discharge devices of low maintenance cost, such as cold cathode gaseous discharge tubes; to provide an arrangement of this type which will inherently initiate safety operations in case one of its essential elements should fail; and to provide a simple and inexpensive boiler feedwater control which, with the aid of a simple three-element probe, maintains the water at the desired height between two predetermined levels but rings an alarm and shuts off the fuel supply if the feedwater should fall below a third level.

These and other objects, aspects and features of the invention will be more fully apparent from the following description of a practical embodiment illustrating the genus of the invention. The description refers to a drawing showing a boiler feedwater supply installation incorporating an electronic circuit according to the present invention.

In the drawing, numeral 1 indicates a boiler of any desirable construction which is supplied with water through pipe line 2 and with fuel, for example oil, through pipe line 3. The flow of water and fuel are regulated by remotely controlled gate devices, as for example magnetically controlled valves 10 and 20 connecting feed lines 2 and 3 to the boiler proper through connections 4 and 5, respectively. It will be understood that the boiler proper as well as its burner equipment and the control valves may be of any suitable construction.

The boiler is provided with a probe tank 11 which is connected to the boiler through tubes 12 and 13 and which is sufficiently high to duplicate all level fluctuations in the boiler which determine its proper operation. The probe tank is grounded and provided with three probe rods 21, 22 and 23 which define three critical levels I, II and III, respectively, and are electrically separated from the probe tank by suitable insulating bushings 31, 32 and 33. It will be understood that any suitable probe construction may be used, for example the detecting elements may be directly in the boiler or other vessel, or the probe electrodes may be horizontal or in any other suitable position.

The probes define between themselves and a return connection, as represented by the boiler water 9, for example (or other conductive material), and ground G (or other connection from the container and the liquid to the control circuit), detecting gaps with varying impedances between the several probe terminals including ground, which impedances control the circuit now to be described.

Connected to the wires A and B, constituting the feeding means of a conventional alternating current supply system, are two electron discharge devices K1 and K2, which may be of the cold cathode gaseous discharge type herein shown or of the high vacuum type if desired. The anode circuits contain relay magnets L3 and L4 bridged by conventional smoothing capacitors C1 and C2.

The control electrodes $i1$ and $i2$ are connected through limiting resistors R1 and R2 to taps $a$ and $b$, intermediate the two branches of voltage-divider networks N1 and N2, respectively, connected between supply wires A, B.

Network N1 contains impedance means such as a transformer L1 whose primary L11 is connected between supply wire B and tap $a$, and a resistor R3 connected between $a$ and supply wire A. Network N2 has a transformer L2 connected between tap $b$ and wire A, and a resistor R4 connected between $b$ and wire B.

The relay magnet L3 of conventional design is suitably associated with switches $s1$ and $s3$, switch $s1$ being open and $s3$ closed when L3 is deenergized. Relay magnet L4 similarly controls two switches $s2$ and $s4$, switch $s2$ being closed and $s4$ open with L4 energized. This condition, namely L3 deenergized and L4 energized, is that shown in the figure.

Secondary L12 of transformer L1 is connected between probe 21 and ground, whereas secondary L22 of transformer L2 is connected between probe 23 and ground. The impedance of the primaries L11 and L21 is therefore governed by the presence of conductive material between the detecting terminals 21 and 23, respectively, and ground G.

Switch $s1$ may control feedwater valve 10 which in the present embodiment is assumed to be closed when s1 is open. Switch s2 may control fuel valve 20, which is assumed to be open with s2 closed. Switch s3 connects, when closed, probe terminals 21 and 22, through tap d of the connection between L12 and 21. Switch s4 may control suitable alarm equipment, indicated as bell 40.

This arrangement operates as follows.

With the liquid leved at I, secondary L12 is shirt circuited through the low impedance circuit L12–d–s3–22–9–G–L12, which reduces the impedance of transformer L1 and lowers the voltage drop across L11 and hence the potential of tap a, as compared to that with L12 open. Consequently, tube K1 is nonconducting with L3 deenergized, s1 open and s3 closed, as assumed.

The secondary L22 of transformer L2 is similarly short circuited through L22–23–9–G–L22, which raises the potential level of tap b, as compared to that with L22 open, and renders tube K2 conductive with switch s2 closed and s4 open, as assumed.

Under these conditions, valve 10 is closed, valve 20 open, the alarm ineffective, switch s3 closed, and the boiler plant in normal operation.

If the level now falls below probe 22, as indicated at II, the path bridging secondary L12 is opened, the impedance of L1 increases, the potential of a rises and tube K1 becomes conductive, so that magnet L3 is energized, switch s1 closes and s3 opens.

The closing of switch s1 causes opening of valve 10 and feedwater to be supplied to the boiler.

When the now rising water level reaches probe 22, the short circuit around transformer secondary L12 is not yet established because s3 is open, so that valve 10 remains open. Only when the water reaches probe 21 is a circuit formed through L12–d–21–9–G–L12 which lowers the potential of tap a and extinguishes tube K1, again opening switch s1 and closing switch s3. Valve 10 is now again closed, and remains closed until the level falls below II, when the above-described cycle is repeated.

If for some reason, for example failure of valve 10 to open, the water level should fall below probe 23 to level III, the short circuit across secondary L22 is interrupted at 23, the impedance of L2 increases, the potential of tap b falls, tube K2 becomes nonconductive, L4 deenergized, switch s2 opens and s4 closes. The alarm 40 sounds and fuel valve 20 closes.

If tube K2 should fail, L4 would be deenergized, the fuel cut off, and the alarm sounded. If tube K1 should fail, valve 10 would not open upon the level dropping below probe 22, and tube K2 would perform its safety function as soon as the level falls below probe 23.

It will now be evident that the correlation of the probes and of auxiliary switch s3 according to the present invention provides a very simple expedient for maintaining the level between probes 21 and 22 and for initiating emergency measures when the level drops below 23 or the main tube K1 fails.

It will be apparent that the above arrangement may be used wherever an operating condition can be detected through change of impedance in detecting gaps between two or more probe terminals, and that the above-described signal transmission through opening of a transformer secondary, although an important improvement in one aspect of the invention, is not generally essential, any corresponding change in impedance which affects the potential level of a control electrode tap, such as a and b of networks N1 and N2, having the desired effect.

It should be understood that the foregoing description of the present invention is for purposes of illustration only and that numerous other modifications and equivalents may be devised by those skilled in the art without departing from the scope of the invention.

I claim:

1. In apparatus for controlling the level of fluid in a container wherein several detecting probe terminals are located at various levels, the combination of: two discharge devices, each having an anode, cathode, and control electrode; a relay and voltage supply in the anode to cathode circuits of each of said devices; four detecting terminals constituting three detecting gaps adapted to be successively connected or disconnected by said fluid; a control network coupling the control electrode of the first of said discharge device to the first of said gaps, and adapted to render said first device non-conductive when said first gap is connected by said fluid; a normally closed contact operated by the relay in the anode to cathode circuit of said first discharge device, arranged to connect the probe terminals of the first and second of said gaps, thereby causing said first device to remain non-conductive when said second gap is connected by said fluid; a control network coupling the control electrode of the second of said discharge devices to the third of said gaps and adapted to maintain said second device conductive when said third gap is connected by said fluid; and emergency operator means connected in the anode-cathode circuit of said second discharge device.

2. In apparatus for controlling the level of fluid in a container wherein several detecting prove terminals are located at various levels, the combination of: two discharge devices each having an anode, cathode and control electrode; an alternating current source having two feeding wires to which said anodes and cathodes are connected; relay means in each of said connections; four detecting terminals constituting three detecting gaps adapted to be successively connected or disconnected by said fluid; a transformer having a primary which is connected between the control electrode of one of said discharge devices and its cathode feed wire, and a secondary connected across the first detecting gap; a second transformer having a primary which is connected between the control electrode of the second discharge device and its anode feed wire, and a secondary connected across the third detecting gap; a switch connected across the probe terminals of said first and second detecting gaps and adapted to be opened upon operation of the relay energized by said first discharge device when conductive thereby breaking the circuit from the secondary of said second transformer to said second gap, so that said first discharge device remains conductive until said first gap is bridged by said fluid; and emergency operator means connected in the anode-cathode circuit of said second discharge device.

3. In apparatus for controlling the level of fluid in a container wherein several detecting probe terminals are located at various levels, the combination of: two discharge devices each having an anode, cathode and control electrode; an alternating current source having feeding means to which said anodes and cathodes are connected; relay means in each of said connections; four detecting terminals constituting three detecting gaps adapted to be successively connected or disconnected by said fluid; an inductor connected between each of said electrodes and one of said feeding means respectively; inductor means arranged for magnetically coupling said inductors to the detecting gaps between the first and fourth and second and fourth of said terminals respectively; a switch connecting the second and third of said terminals and adapted to be opened upon operation of the relay energized by the first of said discharge devices when conductive, thereby breaking the circuit from the secondary of said second transformer to said second gap, so that said first discharge device remains conductive until said first gap is bridged by said fluid; and emergency operator means connected in the anode-cathode circuit of said second discharge device.

4. In apparatus for controlling the level of fluid in a container wherein several detecting probe terminals are located at various levels, the combination of: two discharge devices each having an anode, cathode and control electrodes; a current source having feeding means to which the anodes and cathodes of said devices are connected; relay means in each of said connections; four detecting terminals constituting three detecting gaps adapted to be successively connected or disconnected by said fluid; an impedance connected between each of said electrodes and one of said feeding means; means for coupling said impedances to the detecting gaps between the first and fourth and second and fourth of said terminals respectively; a switch connecting the second and third of said terminals and adapted to be opened upon operation of the relay energized by said first discharge device when conductive, thereby breaking the circuit from the secondary of said second transformer to said second gap, so that said first discharge device remains conductive until said first gap is bridged by said fluid; and emergency operator means connected in the anode-cathode circuit of said second discharge device.

JOHN A. LONG.

REFERENCES CITED

The following references are of record in the file of this patent:

UNITED STATES PATENTS

| Number | Name | Date |
| --- | --- | --- |
| 1,979,127 | Warrick | Oct. 30, 1934 |
| 2,078,479 | Briggs | Apr. 27, 1937 |
| 2,202,197 | Ewertz | May 28, 1940 |
| 2,357,371 | Wolfner | Sept. 5, 1944 |
| 2,358,433 | Wolfner | Sept. 19, 1944 |
| 2,385,161 | Pinkerton | Sept. 18, 1945 |